No. 659,926. Patented Oct. 16, 1900.
C. B. JACOBS.
PROCESS OF MANUFACTURING ABRASIVE MATERIAL.
(Application filed May 4, 1900.)

(No Model.)

Witnesses
Inventor
Charles B. Jacobs

UNITED STATES PATENT OFFICE.

CHARLES B. JACOBS, OF EAST ORANGE, NEW JERSEY, ASSIGNOR, BY MESNE ASSIGNMENTS, TO THE GENERAL ELECTRO-CHEMICAL COMPANY, OF JERSEY CITY, NEW JERSEY.

PROCESS OF MANUFACTURING ABRASIVE MATERIAL.

SPECIFICATION forming part of Letters Patent No. 659,926, dated October 16, 1900.

Application filed May 4, 1900. Serial No. 15,507. (No specimens.)

*To all whom it may concern:*

Be it known that I, CHARLES B. JACOBS, a citizen of the United States, residing at East Orange, in the county of Essex and State of New Jersey, have invented certain new and useful Improvements in Processes of Manufacturing Abrasive Material from Bauxite or other Hydrous Oxides of Aluminium, of which the following is a specification.

This invention relates to processes of manufacturing abrasive material from bauxite or other hydrous oxids of aluminium.

I have found that when bauxite, which is the naturally-occurring hydrated oxid of aluminium, is fused in an electric furnace and then slowly cooled the material from being amorphous and soft is transformed into a crystalline material which has a hardness somewhat greater than that of corundum and at the same time a much greater degree of toughness, which makes it superior to corundum for use as an abrasive or cutting or grinding agent.

While the process may be carried on with the hydrous bauxite fused directly in an electric furnace and my invention broadly contemplates such a method of operation, I have found that some advantages result from a preliminary calcining of the bauxite to drive off the water, for when the hydrous oxid is treated directly in an electric furnace there is a considerable expenditure of energy and consumption of the carbon electrodes, which are avoided by the prior calcining of the material. The calcining may be performed in any usual drying-furnace, while the fusing operation may be carried out in any suitable type of electric furnace; but in order to carry out the process in an efficient manner I propose to operate in a furnace of the construction shown in the accompanying drawings, wherein—

Figure 1:
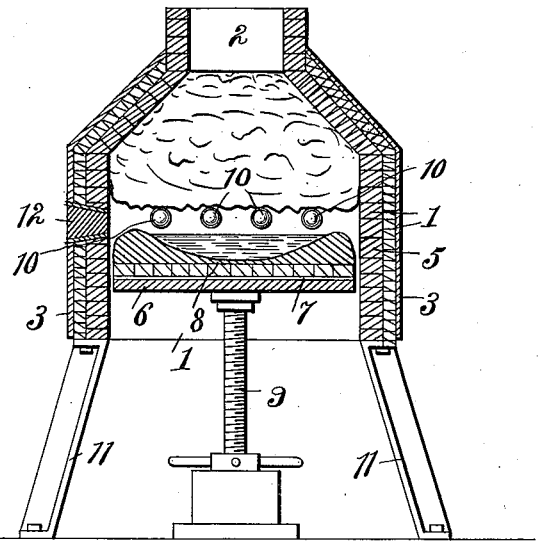
Figure 2:
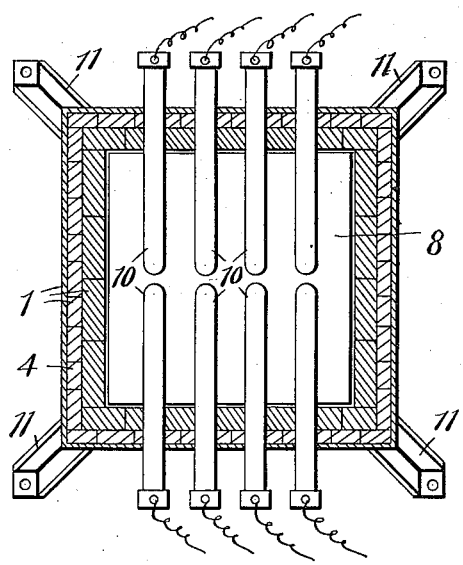

Figure 1 is a vertical section, and Fig. 2 a horizontal section, of such furnace.

The furnace has the form of a rectangular casing 1 with a sloping top, at the apex of which is an opening 2, which constitutes the charging-hole of the furnace as well as the escape-flue for the volatile matter of the charge. The furnace-casing is constructed with a sheet-iron shell 3, lined with fire-brick or ground lime 4, to serve as a non-conducting material both in regard to heat and electricity. Next to this is put a lining of carbon bricks 5. The hearth of the furnace is a cast-iron plate 6, lined first with ground lime 7 and then carbon bricks 8, laid in the lime. The hearth is mounted on a capstan screw 9, by means of which it may be raised and lowered gradually during the operation, so as to obtain a thick body of fused material. Just above the hearth where it is raised to its highest position are mounted four pairs of carbon electrodes 10, between which arcs are kept playing. The furnace is mounted on cast-iron legs 11, of such a height that the hearth may be lowered clear of the bottom of the furnace by means of the capstan-screw. Each pair of electrodes is placed at such a distance from the side walls that the material resting on the hearth at the side walls escapes fusion, thus keeping the hearth and the side walls clear of fused material, so that the hearth may move easily up and down in the furnace.

A hole may be made in the side of the furnace to permit of inspection and of the insertion of a stirring-rod, said hole being normally closed by a plug 12, as shown.

The process is preferably carried out as follows: The bauxite or other aluminium hydrate is first calcined in any suitable drying-furnace to drive out substantially all of the water and is then transferred to the electric furnace, the hearth being first raised to a position about one inch below the electrodes, between each pair of which contact is made by bringing them together. The furnace is now charged full to the top with lumps of (preferably calcined) bauxite and the current turned into the electrodes. Arcs are established between each pair of electrodes by drawing them apart by means of the usual controlling devices made for operating arc-furnaces. The bauxite above the arc fuses and runs down onto the hearth, which is lowered at the rate of about two inches in every hour. By this means the charge in the furnace is melted into a quiet pool of fused aluminium oxid, which cools and solidifies in crystalline form as the hearth of the furnace descends.

The nature of the product may be varied by the slow or rapid cooling of the massed mass, so as to obtain a product of the same degree of absolute hardness, but of varying toughness, and consequently varying abrasive power, by the slow or rapid lowering of the hearth. The more slowly the product cools the better defined will be its crystallization and the greater its toughness and abrasive power. The nature of the product may also be varied by agitating the mass while cooling, as by a poker or stirring-rod inserted through the hole normally closed by plug 12, and thus disturbing its natural tendency of crystallization, producing thereby a finer grain of cyrstalline structure than when the material cools without disturbance.

During the fusing operation the material as fast as it forms runs down past the carbons and does not remain in contact with or between the carbons for any appreciable time, so that no reduction thereof takes place.

It is obvious that the entire process may be carried out in the electric furnace, which in that event serves both to calcine and to fuse the material; but preferably, as before indicated, the calcining is done independently and beforehand in any suitable drying-furnace. When, therefore, I refer to the hydrate being heated in the electric furnace, I intend to include such heating of the hydrate either with or without previous calcining.

Having thus described my invention, what I claim as new therein, and desire to secure by Letters Patent, is—

1. The process of making a crystalline abrasive from amorphous aluminium hydrate which consists in heating the hydrate to a state of quiet fusion in an electric furnace and allowing it to cool slowly into a solid mass of crystalline form and a degree of hardness which makes the material suitable as an abrasive.

2. The process of transforming aluminium hydrate into hard material suitable for abrasives, consisting in calcining the hydrate and fusing it in an electric furnace and allowing it to cool slowly.

3. The process of transforming natural aluminium hydrate into a hard material suitable for abrasives, consisting in first heating the same to drive off the water and thereafter fusing it in the electric furnace and allowing it to cool.

4. The process of transforming soft amorphous hydrous oxid of aluminium into a hard material suitable for abrasives, consisting in fusing the material in the electric furnace and allowing it to cool slowly while in a state of agitation.

CHARLES B. JACOBS.

Witnesses:
HARRY E. KNIGHT,
J. GREEN.